US012504518B2

(12) United States Patent
Hughes

(10) Patent No.: US 12,504,518 B2
(45) Date of Patent: Dec. 23, 2025

(54) ELEVATION MOTOR DESIGN AND MIRROR PLACEMENT

(71) Applicant: Luminar Technologies, Inc., Orlando, FL (US)

(72) Inventor: Sean P. Hughes, Belle Isle, FL (US)

(73) Assignee: Luminar Technologies, Inc., Orlando, FL (US)

( * ) Notice: Subject to any disclaimer, the term of this patent is extended or adjusted under 35 U.S.C. 154(b) by 1247 days.

(21) Appl. No.: 17/330,706

(22) Filed: May 26, 2021

(65) Prior Publication Data

US 2022/0107396 A1 Apr. 7, 2022

Related U.S. Application Data

(60) Provisional application No. 63/088,825, filed on Oct. 7, 2020.

(51) Int. Cl.
| | | |
|---|---|---|
| G02B 26/10 | (2006.01) | |
| G01S 7/481 | (2006.01) | |
| G01S 7/484 | (2006.01) | |
| G01S 17/931 | (2020.01) | |

(52) U.S. Cl.
CPC ............ *G01S 7/4817* (2013.01); *G01S 7/484* (2013.01); *G01S 17/931* (2020.01); *G02B 26/105* (2013.01)

(58) Field of Classification Search
CPC ...... G01S 7/4817; G01S 7/484; G01S 17/931; G01S 7/4814; G02B 26/105
See application file for complete search history.

(56) References Cited

U.S. PATENT DOCUMENTS

| 4,923,262 A | * | 5/1990 | Clay | G02B 26/106 |
| | | | | 359/900 |
| 5,182,659 A | * | 1/1993 | Clay | G02B 26/106 |
| | | | | 359/569 |
| 7,919,898 B2 | * | 4/2011 | Wang | H02K 1/276 |
| | | | | 310/216.127 |
| 8,593,711 B2 | * | 11/2013 | Borchers | G02B 26/101 |
| | | | | 359/219.2 |
| 11,525,975 B1 | * | 12/2022 | Williams | G02B 26/105 |
| 2009/0080035 A1 | * | 3/2009 | Downs | H04N 1/047 |
| | | | | 358/473 |
| 2019/0154836 A1 | | 5/2019 | Campbell et al. | |
| 2019/0222346 A1 | * | 7/2019 | MacKinnon | G02B 19/0014 |
| 2019/0335865 A1 | * | 11/2019 | Mullet | A45B 25/14 |
| 2020/0381156 A1 | | 12/2020 | Duan | |

(Continued)

FOREIGN PATENT DOCUMENTS

JP 6651110 2/2020

OTHER PUBLICATIONS

International Search Report for PCT/US2021/053145 dated Jan. 19, 2022.

Primary Examiner — Bumsuk Won
Assistant Examiner — John Curtis Sipes
(74) Attorney, Agent, or Firm — Van Pelt, Yi & James LLP

(57) ABSTRACT

A scanner for a lidar system configured to direct emitted light to scan a field of regard of the lidar system includes a mirror and an actuator assembly. The mirror includes a first end, a second end, and a reflective surface and is pivotable along a mirror axle. The actuator assembly is disposed at the first end of the mirror and includes an asymmetric motor configured to exert a torque on the mirror to cause the mirror to pivot about the mirror axle.

20 Claims, 13 Drawing Sheets

(56) References Cited

U.S. PATENT DOCUMENTS

| | | | |
|---|---|---|---|
| 2021/0126563 A1* | 4/2021 | Zhu | A47J 43/08 |
| 2021/0384811 A1* | 12/2021 | Rubin | H02K 7/116 |
| 2022/0057626 A1* | 2/2022 | Wang | G02B 26/0858 |
| 2022/0257111 A1* | 8/2022 | Wang | A61B 3/0008 |

* cited by examiner

ELEVATION MOTOR DESIGN AND MIRROR PLACEMENT

CROSS-REFERENCE TO RELATED APPLICATION

The present application claims priority to U.S. Application No. 63/088,825, filed Oct. 7, 2020. The priority application is hereby incorporated by reference in its entirety.

FIELD OF TECHNOLOGY

This disclosure relates generally to lidar sensor heads and, more specifically, to multi-mirror lidar sensor heads having a compact construction so as to occupy minimal area when deployed on a vehicle.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

An autonomous (or "self-driving") vehicle moving along a roadway with dedicated lanes may include a lidar system using a number of sensors and movable mirrors for scanning in different directions. For example, a single elevation mirror may be used for y-scanning purposes. Such mirrors are typically coupled with one or two motors positioned on ends of the mirror to apply the torque thereto to cause rotation. Such a system may be undesirable due to the motors occupying large amounts of space, thereby requiring a larger overall package, and additionally can have dynamic control problems due to the application of torque.

While the precision and efficacy of these systems have continually improved, the power requirements and physical dimensions of existing systems have posed obstacles to designers of such systems. With the increasing prevalence of the use of lidar systems in autonomous vehicles, such considerations are of increased concern to designers of these systems.

SUMMARY

In accordance with a first aspect, a scanner for a lidar system configured to direct emitted light to scan a field of regard of the lidar system includes a mirror and an actuator assembly. The mirror includes a first end, a second end, and a reflective surface and is pivotable along a mirror axle. The actuator assembly is disposed at the first end of the mirror and includes an asymmetric motor configured to exert a torque on the mirror to cause the mirror to pivot about the mirror axle.

In some examples, the actuator assembly includes a core, a coil, and a rotor assembly. The core includes a base portion and a plurality of legs extending therefrom. The base portion defines a coil opening. The coil is operably coupled with the core. The rotor assembly is at least partially disposed between the plurality of legs of the core and includes a rotor housing and a rotor at least partially disposed within the housing to rotatably couple with the mirror along the mirror axle.

In some examples, the rotor assembly includes at least one curved magnet operably disposed on an outer surface of the housing. The at least one curved magnet may be positioned between the plurality of legs of the core. In some examples, the rotor assembly may include at least one bearing disposed within the rotor housing. The at least one bearing may be in the form of a needle bearing.

In some examples, the mirror may include a support structure positioned on an opposite side of the reflective surface. The support structure may extend a length between the first and second ends of the mirror. The support structure may be in the form of a honeycomb support structure.

In some examples, an overall height of the scanner may be approximately 2".

In some approaches, the actuator assembly may include a core having a plurality of legs, a first coil operably coupled with the core, a second coil operably coupled with the core, and a rotor assembly at least partially disposed between the plurality of legs of the core. The rotor assembly may include a rotor housing and a rotor at least partially disposed within the housing to rotatably couple with the mirror along the mirror axle.

In some forms, the scanner may further include a rotatable polygon mirror and a polygon mirror axle. The rotatable polygon mirror includes a block including a first wall, a second wall, and a plurality of reflective surfaces extending between the first and second walls. The reflective surfaces are angularly offset from one another along a periphery of the block. The polygon mirror axle extends into the block through at least one of the first wall or the second wall, about which the block rotates. In some of these examples, the polygon mirror axle may be orthogonal to the mirror axle.

In some forms, the polygon mirror may be configured to receive the emitted light from a light source of the lidar system and the reflective surfaces of the polygon mirror may be configured to sequentially reflect the emitted light toward the reflective surface of the mirror. The reflective surface of the mirror may be configured to receive the emitted light from the polygon mirror and reflect the emitted light onto the field of regard of the lidar system.

In some examples, the scanner may further include a stationary mirror. The stationary mirror may be configured to receive the emitted light from the polygon mirror and reflect the emitted light toward the reflective surface of the mirror.

In some approaches, the scanner may be contained within a housing including a window through which the emitted light is transmitted. The mirror may be positioned adjacent to the window.

In accordance with a second aspect, a lidar system may include a light source (i.e., a laser) configured to emit light, a scanner configured to direct the emitted light to scan a field of regard (FOR) in accordance with a scan pattern, a receiver configured to detect at least a portion of emitted light scattered by one or more remote targets, and a controller configured to control motion of the mirror to scan the emitted light along the scan pattern. The scanner includes a mirror and an actuator assembly. The mirror has a reflective surface and a rear surface and is pivotable along a mirror axle. The actuator assembly is disposed at the first end of the mirror and includes an asymmetric motor that exerts a torque on the mirror to cause the mirror to pivot about the mirror axle.

DETAILED DESCRIPTION

Figure 1:
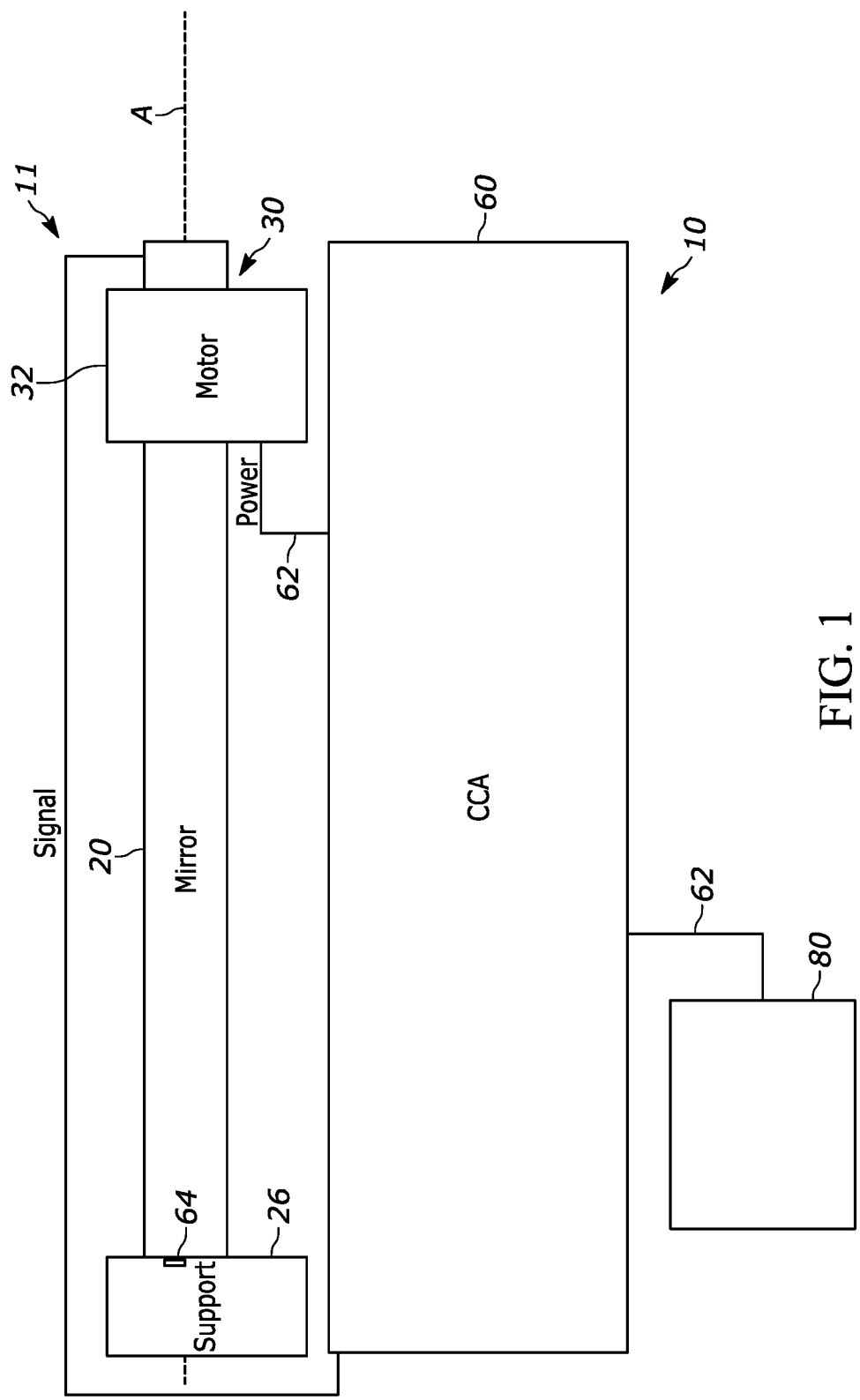
FIG. 1 is a schematic view of an example lidar system having an example scanner in accordance with various embodiments of the present disclosure.
Figure 2:
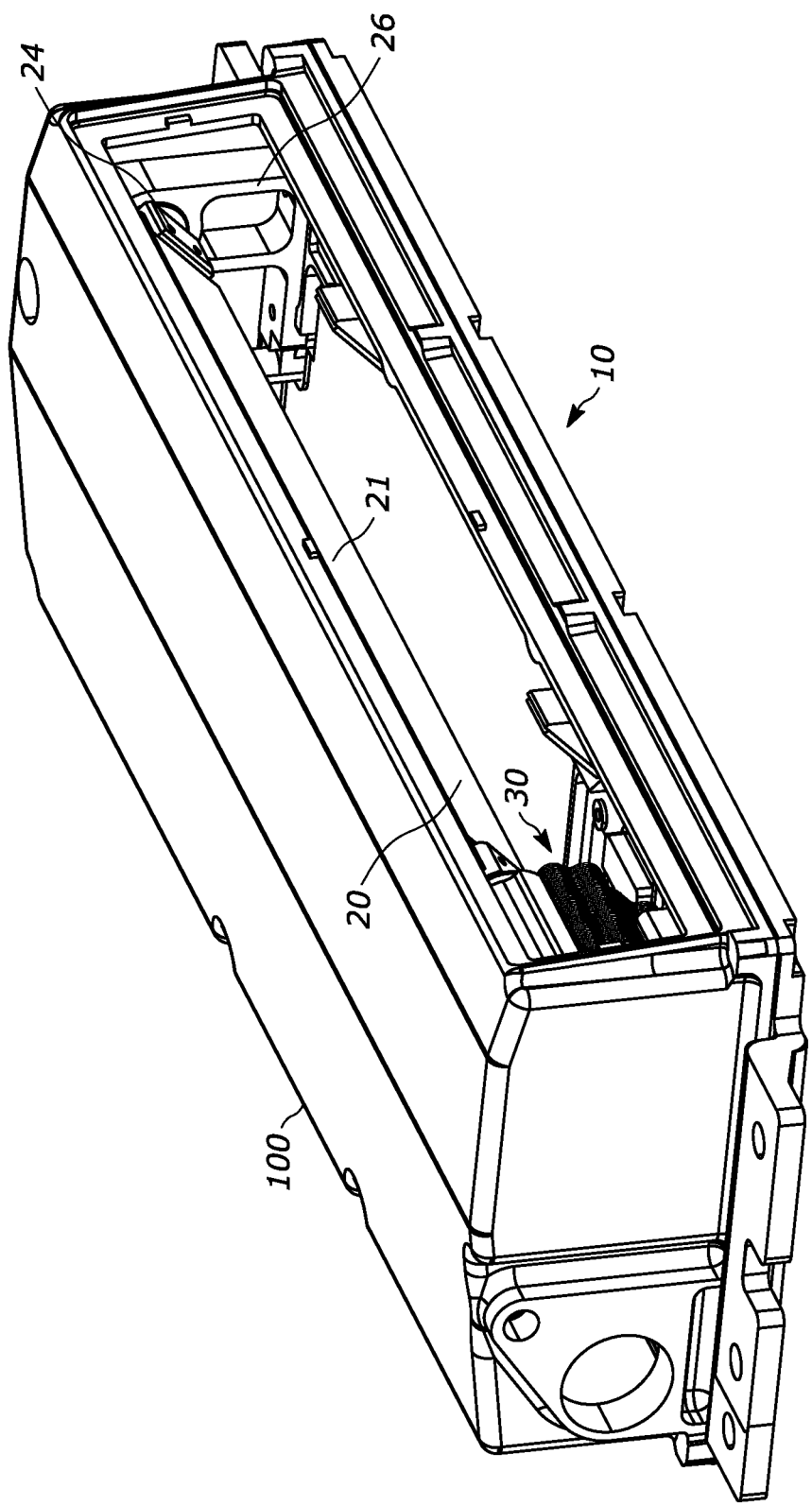
FIG. 2 is a front perspective view of the example scanner of FIG. 1 in accordance with various embodiments.
Figure 3:
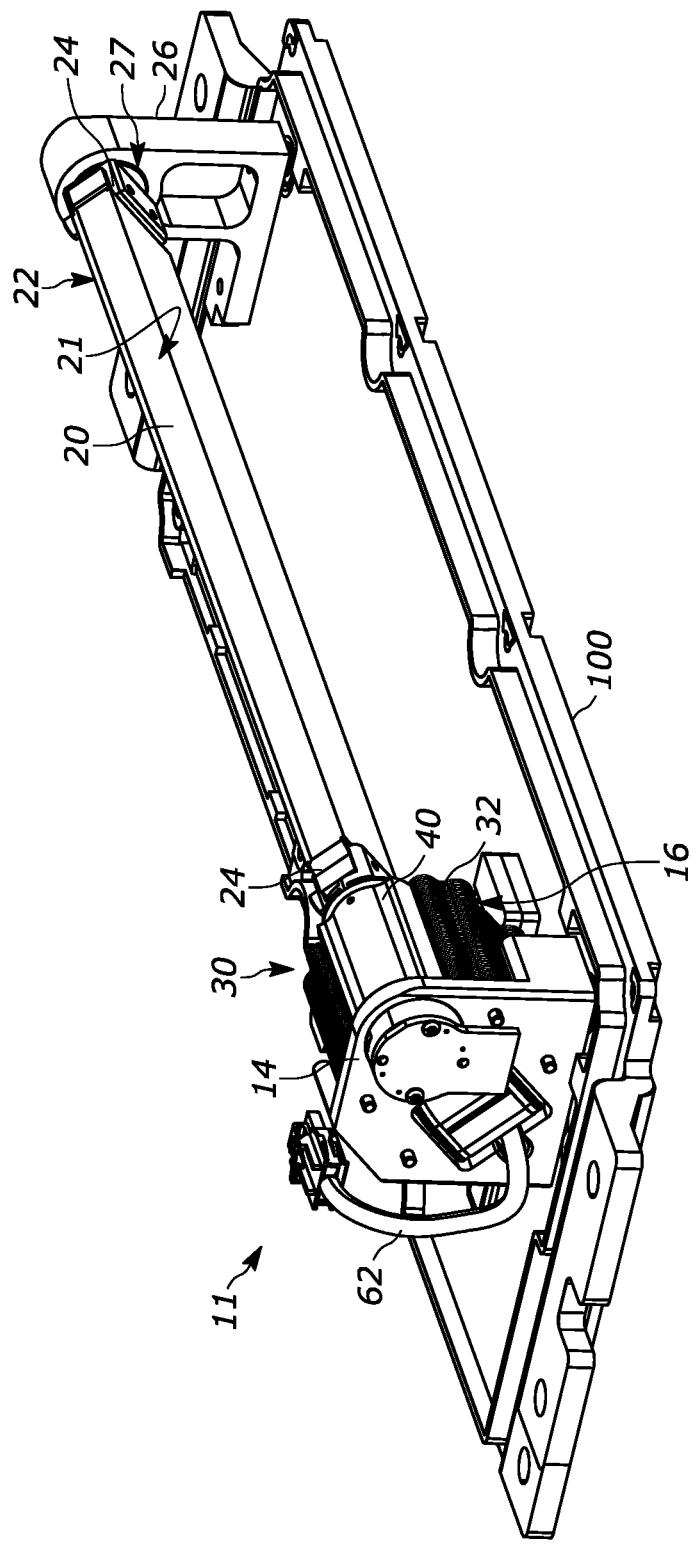
FIG. 3 is a front perspective view of the example scanner of FIGS. 1 and 2, with a portion of an example housing removed for clarity in accordance with various embodiments.
Figure 4:
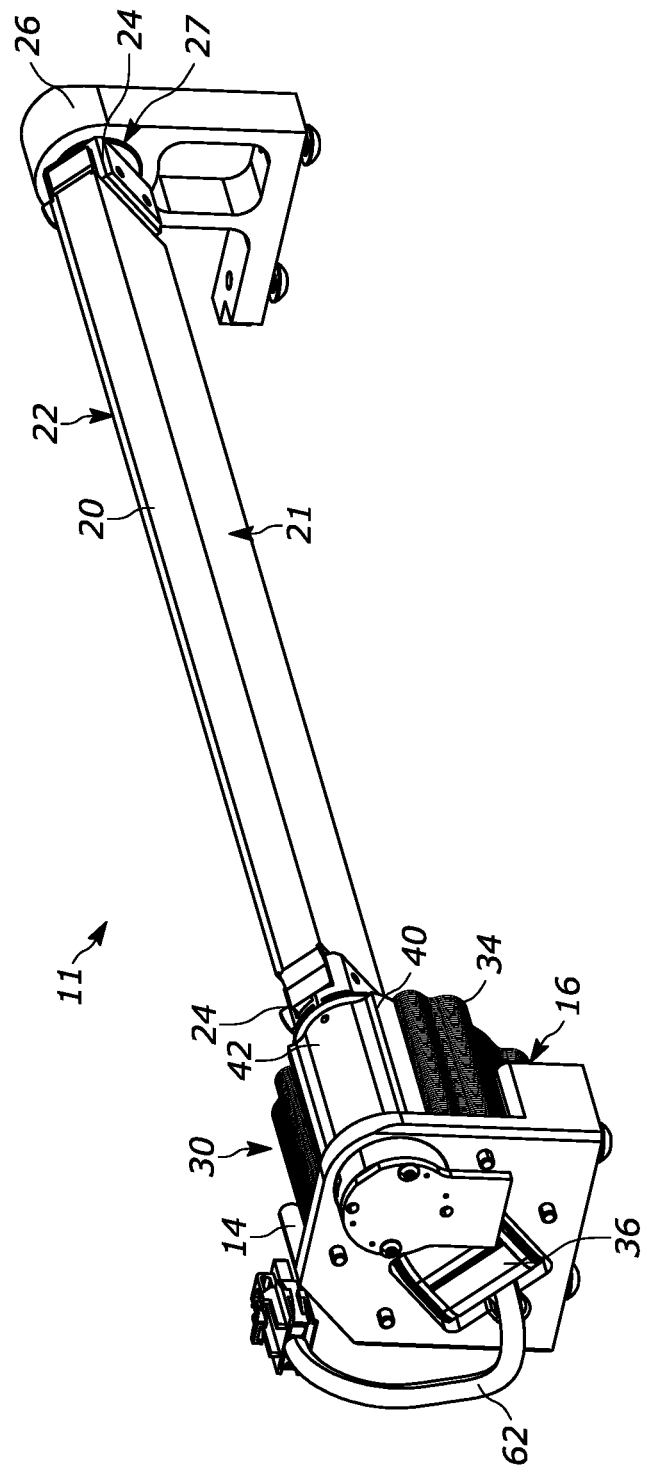
FIG. 4 is a front perspective view of the example scanner of FIGS. 1-3 in accordance with various embodiments.
Figure 5:
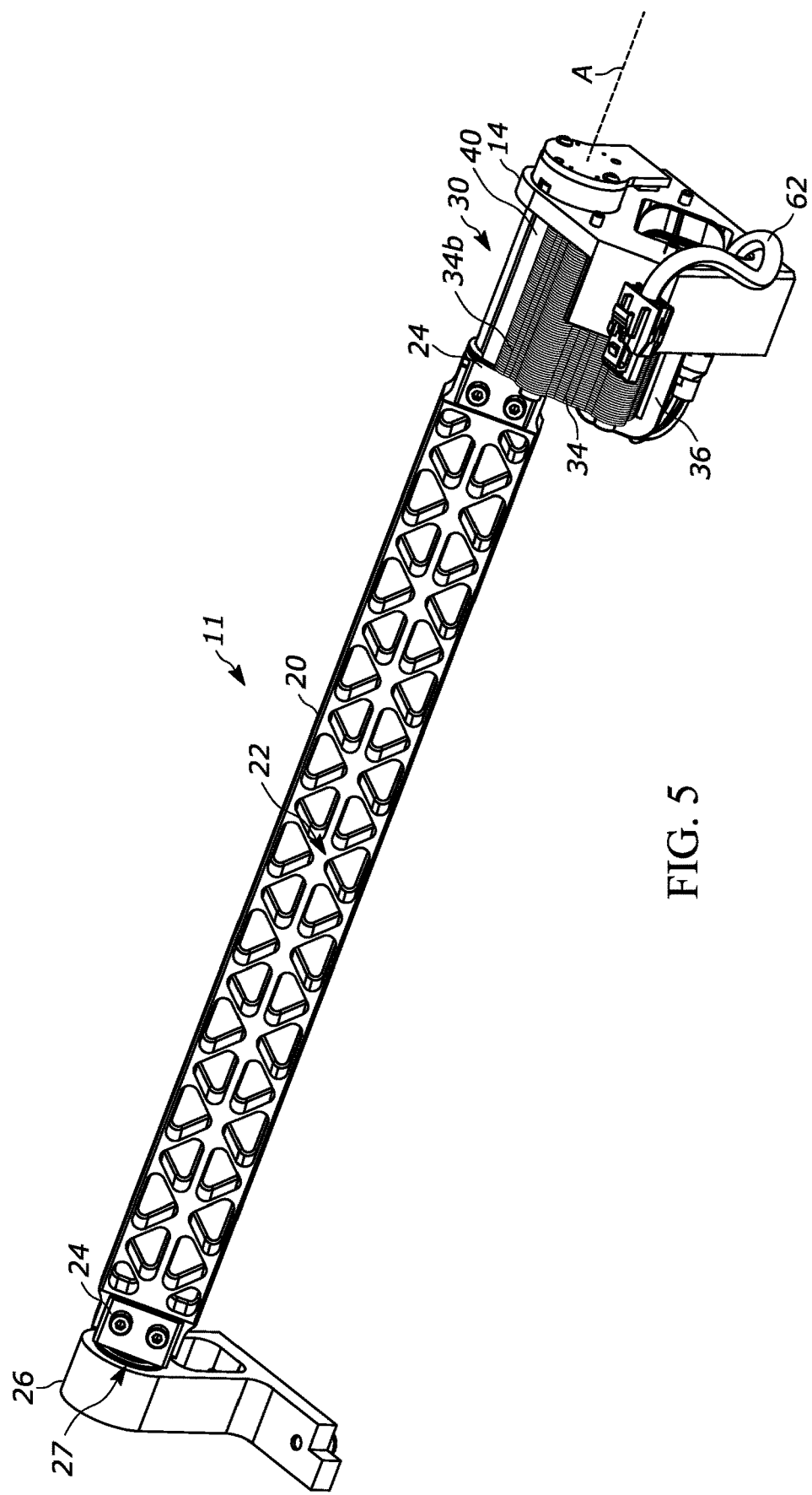
FIG. 5 is a rear perspective view of the example scanner of FIGS. 1-4 in accordance with various embodiments.
Figure 6:
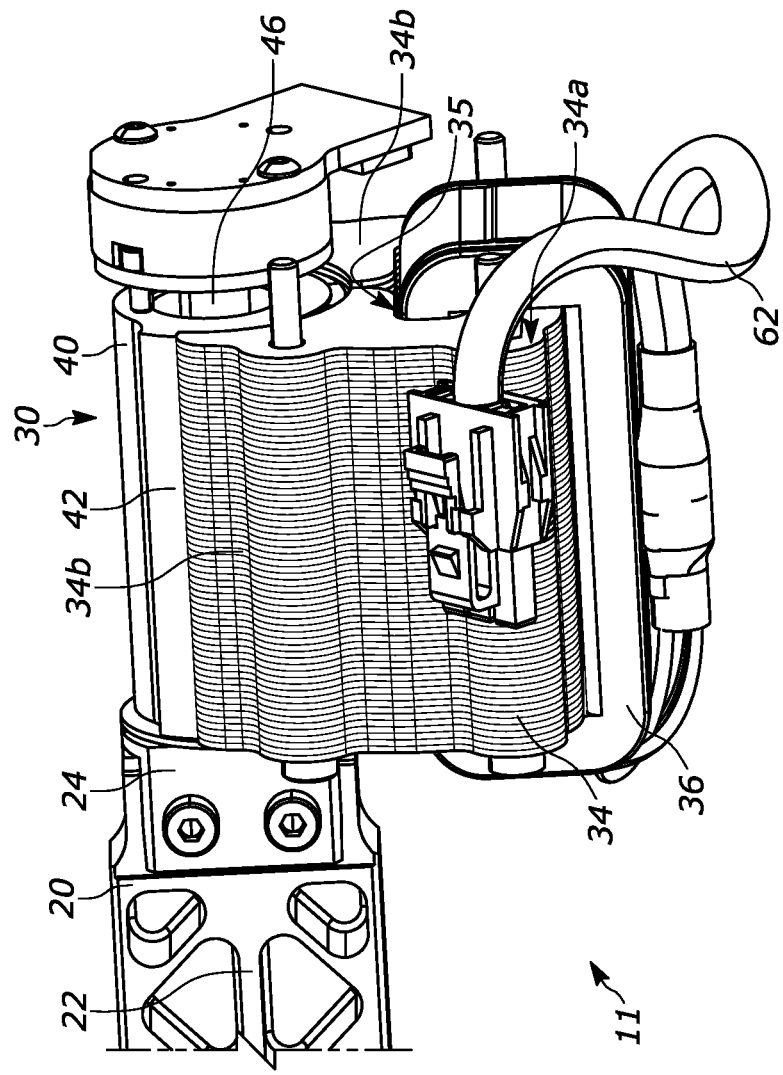
FIG. 6 is a rear perspective view of an example actuator assembly for use with the example scanner of FIGS. 1-5 in accordance with various embodiments.
Figure 8:
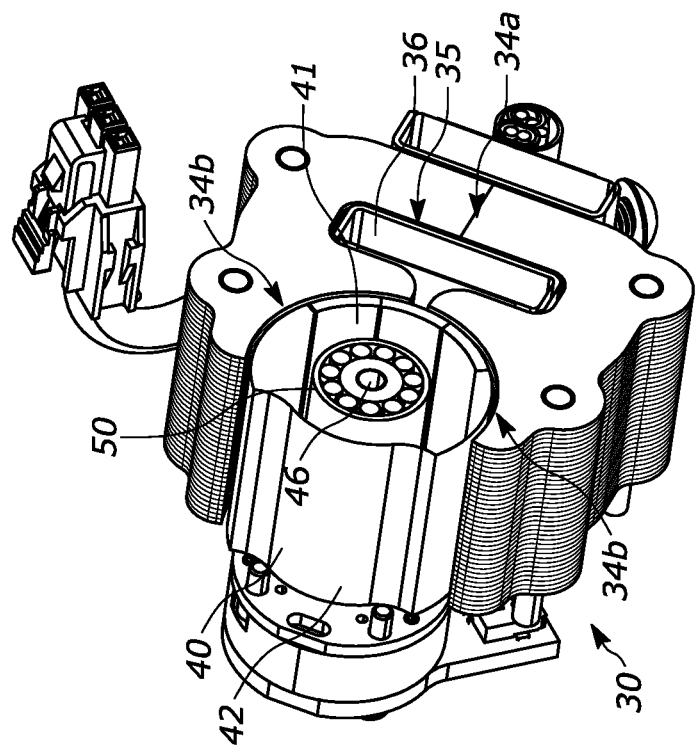
FIG. 8 is a front perspective cross-sectional view of the example actuator assembly for use with the example scanner of FIGS. 1-7 in accordance with various embodiments.
Figure 7:
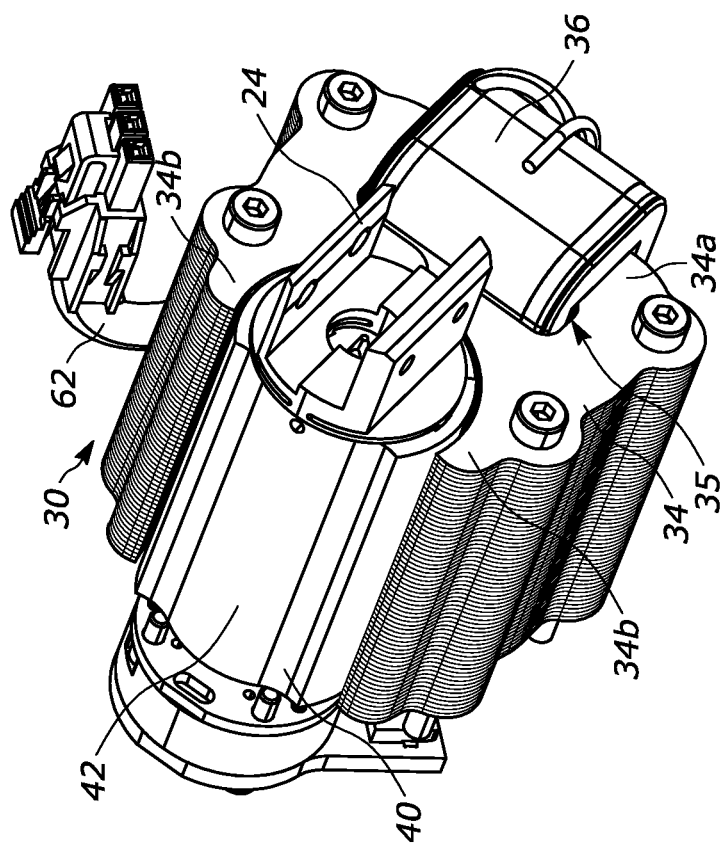
FIG. 7 is a front perspective view of the example actuator assembly for use with the example scanner of FIGS. 1-6 in accordance with various embodiments.
Figure 10:
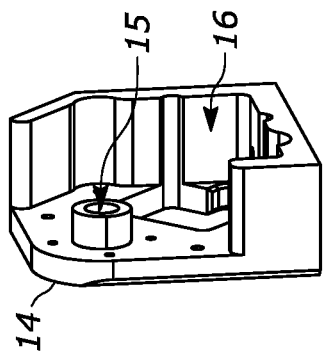
FIG. 10 is a front perspective view of an example support structure for the example actuator assembly of FIGS. 1-9 in accordance with various embodiments.
Figure 9:
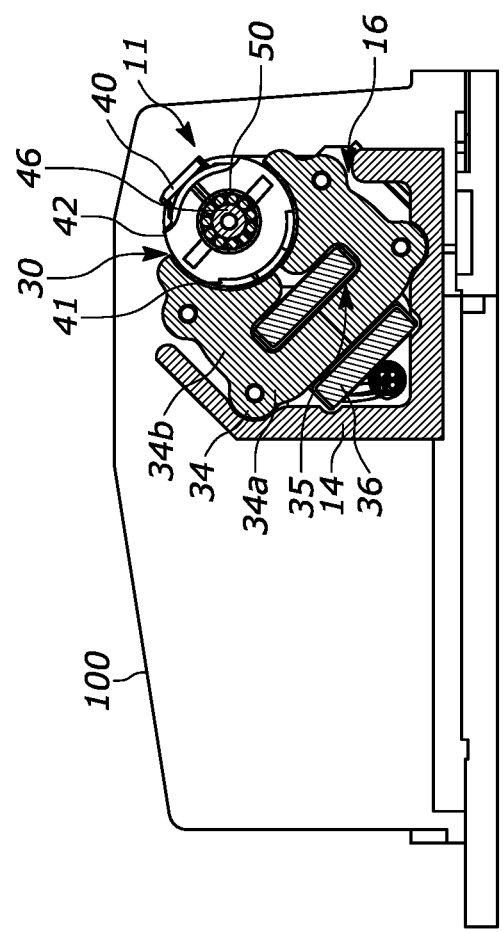
FIG. 9 is a side elevation cross-sectional view of the example actuator assembly for use with the example scanner of FIGS. 1-8 in accordance with various embodiments.

Generally speaking, a lidar sensor unit and various techniques for operating the lidar sensor unit are discussed below, in particular an example assembly of a lidar sensor unit, and particularly a scanner of the lidar sensor unit. The system of this disclosure efficiently incorporates an asymmetric motor design positioned on one side of the motor to save space and to provide an integral unit. More specifically, use of an asymmetric motor positioned to a side of the mirror allows the mirror to be positioned adjacent to the front of the housing, thus resulting in a more compact design. Additionally, the placement of the motor does not require additional vertical headspace, and thus the housing does not extend vertically from the vehicle beyond the height of the mirror. The system may eliminate the need to use exotic materials for the mirror and motor components.

The scanner of the lidar sensor unit is provided with a low profile when compared to conventional multi-mirror lidar systems. Certain structural and operational features of the lidar sensor units of the present disclosure may be employed, individually or collectively, to not only minimize the three-dimensional footprint or volume of space occupied by the lidar scanner, but also serve to improve aerodynamic performance (both internally and externally), reduce audible noise, reduce heat, and improve resistance to vibration, acceleration, deceleration, or other environmental factors that might otherwise negatively affect scanner accuracy and performance.

Turning now to the Figures, an example lidar sensor unit or system 10 includes a scanner 11, a light source (not illustrated) configured to emit light, a receiver (not illustrated) and a controller 60 provided in the form of a printed circuit board (e.g., a circuit card assembly). The scanner 11 is configured to direct emitted light to scan a field of regard ("FOR") of the lidar sensor unit 10 in accordance with a scan pattern. Generally, the scanner 11 includes a mirror 20 and an actuator assembly 30 disposed on a side of the mirror 20.

More specifically, the mirror 20 is in the form of a planar mirror that includes a reflective surface 21 and a rear surface 22 and is pivotable along a mirror axle "A" extending therethrough. The mirror 20 includes any number of rotatable support or mounting members 24 coupled with the mirror 20 and being positioned at opposing first and second ends. In the illustrated examples, the rotatable support member 24 is in the form of a trunnion having two arms that receive a portion of the mirror 20 therebetween. Other examples are possible.

The first end of the mirror 20 includes a first endcap 14 having any number of mounting members to mount the scanner 11 within a housing 100 of the lidar sensor unit 10. Further, the first endcap 14 includes a mirror mounting bore 15 dimensioned to accommodate the rotatable mounting member 24 positioned at the first side. Further still, the first endcap 14 includes a ledge or opening 16 dimensioned to receive a number of components of the actuator assembly 30. The second end of the mirror 20 includes a second endcap 26 having any number of mounting members to mount the scanner 11 within a housing 100 of the lidar sensor unit 10. Further, the endcap 26 includes a mirror mounting bore 27 dimensioned to accommodate the rotatable mounting member 24 positioned on the second side of the mirror 20 to allow the mirror 20 to rotate relative to the endcap 26. As previously noted, the mirror 20 may be constructed from any number of suitable materials such as, for example, aluminum.

The actuator assembly 30 is disposed at the first end of the mirror 20 and includes an asymmetric motor 32 that exerts a torque on the mirror 20 to cause the mirror 20 to pivot about the mirror axle A. Generally, the actuator assembly 30 includes a combination of steel and magnetic components that are fixed in place and located adjacent to a coil assembly 36. The magnetic components provide a static magnetic field to the coil assembly 36. When an electrical current is provided to the coil assembly 36, the coil assembly 36 produces a magnetic field in response to the electrical current. The magnetic field produced by the coil assembly 36 interacts with the static magnetic field provided by the magnetic components, which in turn results in a rotational torque applied to the coil assembly 36. By applying a time-varying electrical current to the coil assembly 36, the mirror 20 can be made to move along a particular scan trajectory. So configured, the actuator assembly 30 applies a rotational torque evenly across the mirror 20, so even if the mirror 20 oscillates at a rapid frequency, the mirror 20 does not significantly flex, twist, or warp.

More specifically, the motor 32 includes a core 34 having a base portion 34a and a plurality of legs 34b extending therefrom. The base portion 34a defines a coil opening 35. The motor 32 further includes the aforementioned coil assembly 36 operably coupled with the core 34 and being at least partially positioned within the coil opening 35, and further includes a rotor assembly 40 at least partially disposed between the plurality of legs 34b of the core 34. The rotor assembly 40 includes a rotor housing 42 and a rotor 46 at least partially disposed within the rotor housing 42 to rotatably couple with the mirror 20 along the mirror axle A. In the illustrated example, the rotatable support mounting member 24 is integrally formed with the rotor housing 42.

A plurality of magnets 41 are positioned on the outer periphery of the rotor housing 42, and in some cases, may be positioned between the plurality of legs 34b of the core 34. Notably, the rotor assembly 40 is positioned asymmetrically relative to the main body (i.e., the core 34 and the coil 36) of the asymmetric motor 32, meaning the rotor assembly 40 is disposed at or near a side or a corner of thereof. Such an arrangement allows the asymmetric motor 32 to be positioned or otherwise "tucked into" a rearward facing portion of the housing 100, thereby reducing its overall height and width dimensions.

The controller 60 includes wiring 62 to electrically couple the motor 32 therewith such that the motor 30 receives power from the controller 60. In some examples, a position sensor 64 may be provided and operably coupled with the motor 30 to determine a position of the motor (and thus, a position of the mirror 20). In some examples, and as illustrated, the position sensor 64 may be provided on the second end of the mirror 20. More specifically, the position sensor 64 may be operably coupled with the second endcap 26 and/or the mounting member 24 positioned on the second end of the mirror 20 to sense the position of the mirror 20 (and thus the respective motor position). In contrast to conventional systems which dispose the position sensor 64 at or near the motor assembly (due in part to the additional space afforded by the use of a larger, non-asymmetrical motor), presently, by positioning the position sensor 64 at the supporting end of the mirror 20 reduces potential stresses on the position sensor 64. More specifically, the position sensor 64 will not experience increased heat generated by the motor, as it is positioned a suitable distance away from the actuator assembly 30. In such an arrangement, the controller 60 accounts for any delay sensed by the position sensor 64 due to the second end of the mirror 20 flexing during rotation. In some examples, this delay may be approximately 200 ms. Other examples are possible.

As previously noted, the mirror 20 may be constructed from any number of suitable materials such as, for example, aluminum. The mirror 20 may be provided with an optimized geometry to enhance durability and service life. For instance, the mirror 20 may have a center of gravity closer to its reflective surface than conventional planar mirrors of lidar sensor units. This may be effected by constructing a pivotable backing or support surface for the reflective surface of the mirror 20 of a honeycomb structure or other ribbed structure, with material arranged such that the center of gravity of the mirror 20 is closer to the reflective surface than to an edge of the ribbed or honeycomb structure opposite the reflective surface.

It is appreciated that any number of suitable approaches for providing electrical contacts to the actuator assembly 30 as well as relative mounting locations are envisioned. The frequency of the electrical current provided to the coil of the actuator assembly 30 will define a frequency of oscillation of the mirror 20, which in turn controls the scan rate of the scanner 11. The selection of the location of suitable electrodes may be driven by space and mounting considerations of the scanner 11.

As previously noted, the motor 32 is an asymmetric motor. More specifically, the motor 32 includes a rotor 46 and core/stator 34 that are not concentric. Unlike in a standard motor where the motor and stator are concentric, the use of an asymmetric motor allows the mirror 20 to be placed closer to the exit window of the housing 100 than it would if a standard motor were used. Accordingly, the scanner 11 is more compact and low-profile. For example, an overall height of the scanner 11 may be approximately 2". Other examples are possible.

In some examples, the rotor assembly 40 includes at least one curved magnet 41 operably disposed on an outer surface of the housing. The at least one curved magnet 41 may be positioned between the plurality of legs 34b of the core 34.

Figure 12:
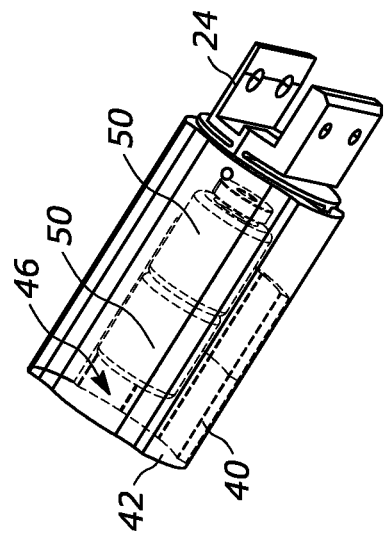
FIG. 12 is a front perspective see-through view of an example rotor assembly for use with the example actuator assembly of FIGS. 1-11 in accordance with various embodiments.
Figure 11:
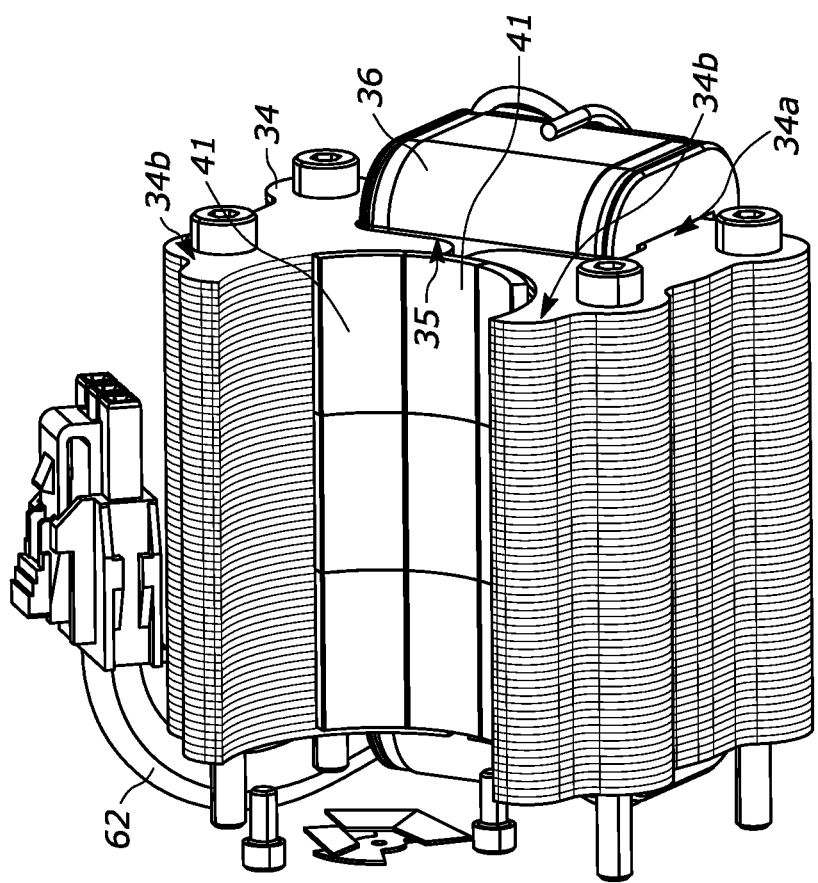
FIG. 11 is a front perspective view of an example stator, coil, and magnets for use with the example actuator assembly of FIGS. 1-10 in accordance with various embodiments.
Figure 13:
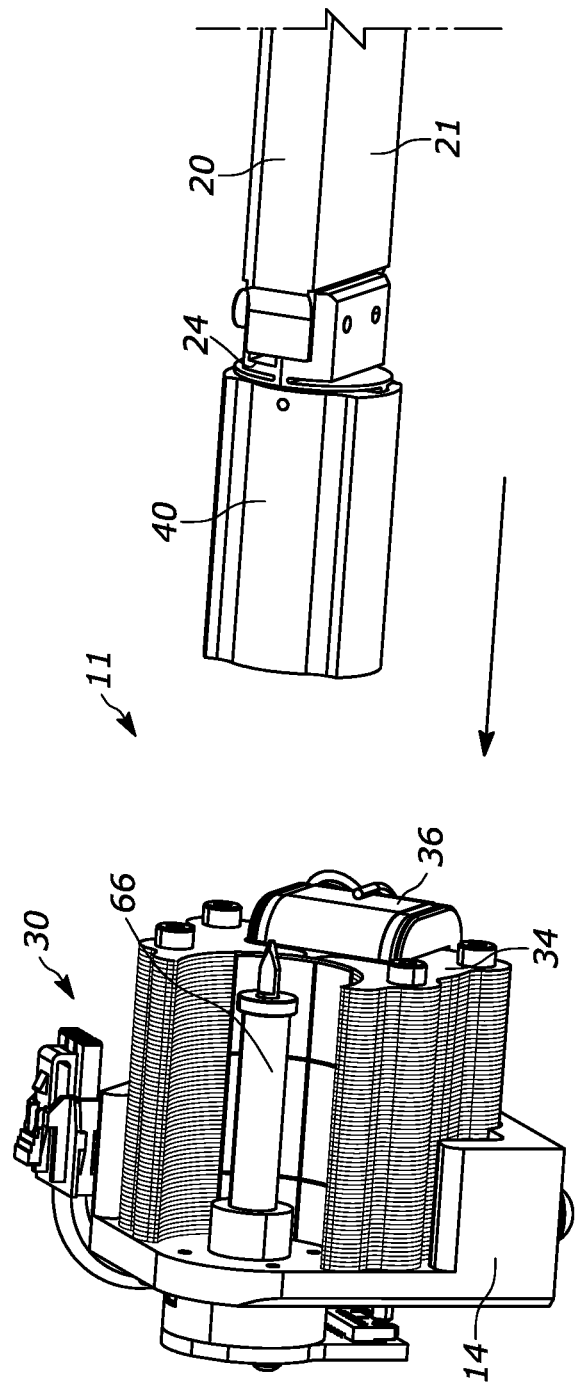
FIG. 13 is a front perspective view of the example actuator assembly of FIGS. 1-12 during assembly in accordance with various embodiments.
Figure 14:
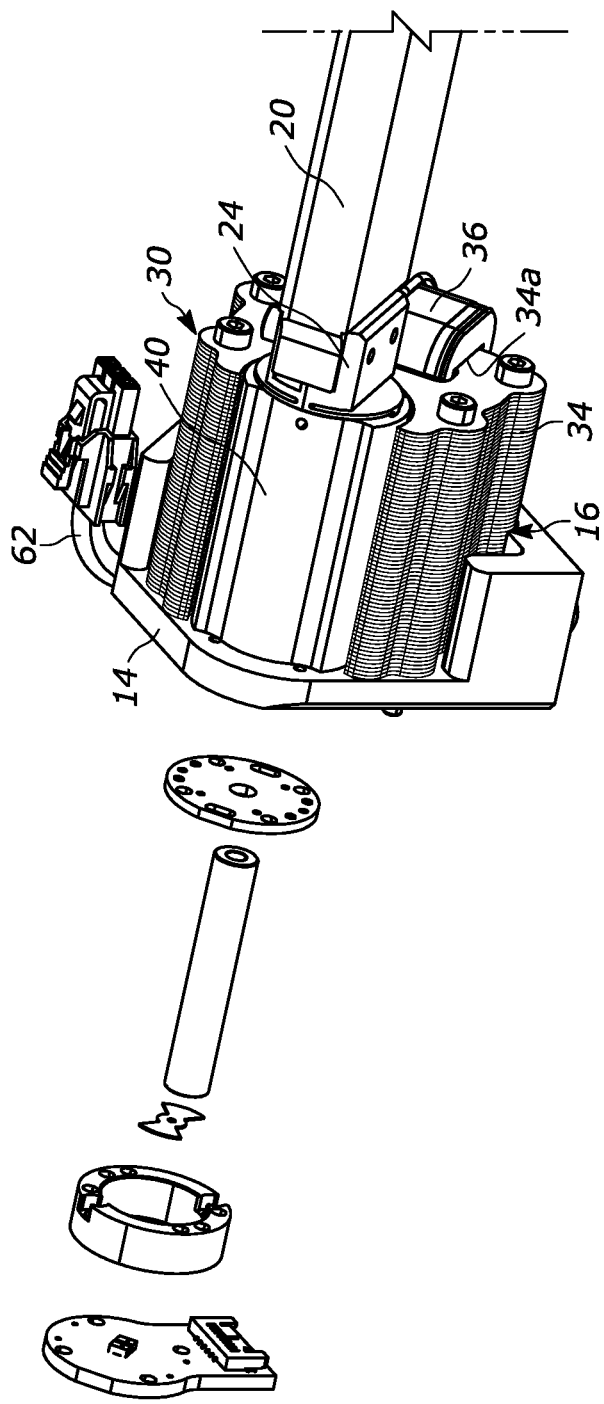
FIG. 14 is a front perspective partially exploded view of the example scanner of FIGS. 1-13 during assembly in accordance with various embodiments.

In some examples, and with reference to FIG. 12, the rotor assembly 40 may include at least one bearing 50 disposed within the rotor housing. The bearing or bearings 50 may be in the form of a needle bearing. Because the rotor assembly 40 is not in the form of a solid magnet, the bearing 50 may be positioned within the rotor housing 42 as opposed to being positioned outside of the rotor assembly, thereby resulting in a smaller, more compact and/or shorter overall actuator assembly 30.

Figure 15:
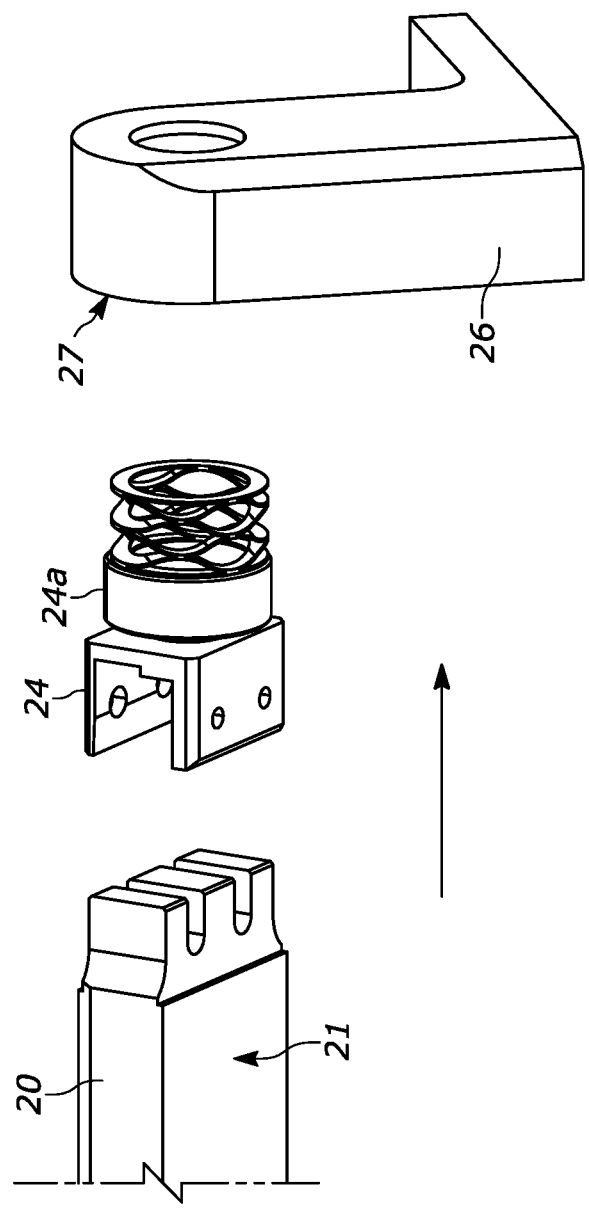
FIG. 15 is a front perspective partially exploded view of an opposing end of the example scanner of FIGS. 1-14 in accordance with various embodiments.
Figure 16:
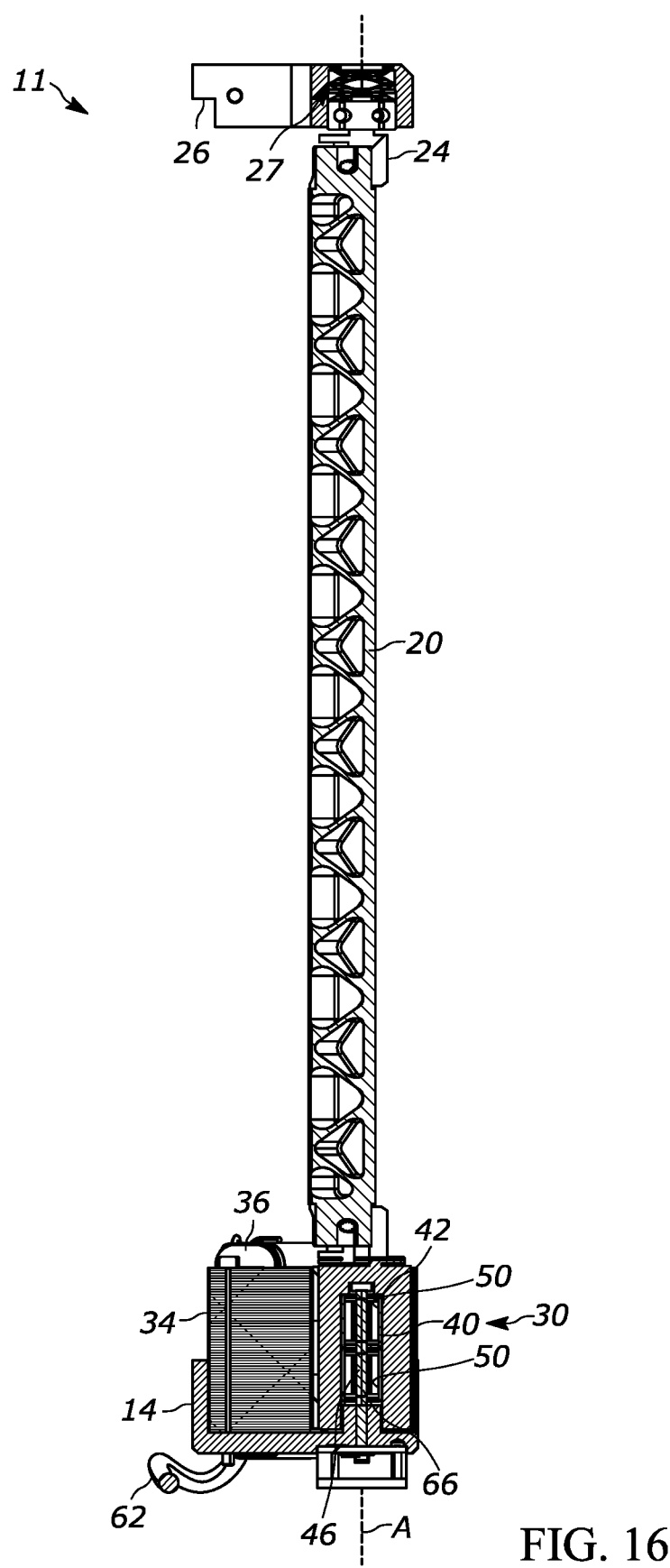
FIG. 16 is a top plan view of the example scanner of FIGS. 1-15 in accordance with various embodiments.

With reference to FIGS. 10-15, the scanner 11 is assembled by inserting a shaft 66 (FIGS. 13 & 14) through the mirror mounting bore 16 of the first endcap 14. The core 34 is positioned within the ledge or opening 16 of the first endcap 14, and is coupled thereto via any number of suitable approaches such as, for example, bolts or other fasteners. It is appreciated that any number of support plates, shafts, washers, and the like may be used to assemble the scanner 11. The rotor 40, which is operably coupled with the first rotatable support 24, is then coupled with the first end of the mirror 20 via any number of suitable approaches such as, for example fasteners. Similarly, as illustrated in FIG. 15, the second rotatable support 24 is coupled with the second end of the mirror 20 via any number of suitable approaches such as, for example, fasteners.

The mirror 20 (and the components such as the rotor 40 and the rotatable supports 24 coupled therewith) is then coupled with the first endcap 14 and the second endcap 26. On the first side of the mirror 20, the shaft 66 is inserted through the rotor housing 40, and on the second side of the mirror 20, the second rotatable support 24, which includes a bearing assembly 24a, is inserted into an opening formed on the second endcap 26. Further, in some examples, a spring or other resilient member 27 may be provided and inserted into the mirror mounting bore 27 formed on the second endcap 26. The first and the second endcaps 14, 26 may then be secured to the bottom or mounting surface of the housing 100. The scanner 11 may then be electrically coupled with the controller 60 via the wiring 62.

In an alternative approach (not illustrated), the actuator assembly 30 includes a core having a plurality of legs, any number of coils (e.g., a first coil operably coupled with the core and a second coil operably coupled with the core), and a rotor assembly at least partially disposed between the plurality of legs of the core. The rotor assembly may include a rotor housing and a rotor at least partially disposed within the housing to rotatably couple with the mirror along the mirror axle.

In some forms, the scanner may further include a rotatable polygon mirror 80 (illustrated schematically in FIG. 1) and a polygon mirror axle. The rotatable polygon mirror 80 may include a block including a first wall, a second wall, and a plurality of reflective surfaces extending between the first and second walls. The reflective surfaces are angularly offset from one another along a periphery of the block. The polygon mirror axle extends into the block through at least one of the first wall or the second wall, about which the block rotates. In some examples, the polygon mirror axle is orthogonal to the mirror axle A.

The orientation of the scanner 11, and specifically, the orientation of the axis of rotation of the polygon mirror 80, may be selected so as to align with an orientation of a vehicle in which the lidar sensor unit 10 operates. In some implementations, however, a lidar sensor unit operating in a vehicle includes multiple lidar sensor units, with at least some of the lidar sensor units oriented differently from each other.

The second mirror cooperates with the mirror 20 to perform a scan of a field of regard (FOR) of the lidar sensor unit 10. The first, pivotable planar mirror 20 may be referred to herein as a Y-scan mirror, but it is understood that depending on the orientation of the first and second mirrors, the scanning range achieved by the first mirror 20 may be in any of the X- Y- or Z-planes. The rotatable polygon mirror includes a block having a plurality of (preferably at least four) finished reflective surfaces. It is possible, however, to use a triangle-shaped rotatable polygon mirror with three reflective surfaces. In another implementation, not every surface of the rotatable polygon mirror oriented toward the planar mirror 20 is reflective (e.g., the rotatable polygon mirror can be a flat substrate with reflective surfaces on the front and back sides). More generally, the rotatable polygon mirror may have any suitable number of reflective surfaces, such as for example any number between two and eight reflective surfaces. The polygon mirror may be made from any suitable material, such as for example, glass, plastic (e.g., polycarbonate), metal (e.g., aluminum or beryllium), metal foam, carbon fiber, ceramic, or any suitable combination thereof.

The rotatable polygon mirror 80 further includes a first wall and a second wall. Each of the plurality of reflective surfaces extends between the first and second walls. The reflective surfaces are angularly offset from one another along a periphery of the block.

As the polygon mirror 80 rotates, the scanner 11 produces one scan line for each reflective surface of the polygon mirror 80, and the planar mirror 20 pivots to distribute the scan lines across the FOR. Thus, if the scan lines are directed horizontally, the polygon mirror 80 is responsible primarily for the horizontal dimension of the field of regard, and the planar mirror 20 accordingly is responsible for vertical dimension of the field of regard. The polygon mirror 80 may be positioned so the reflective surfaces sequentially reflect emitted light received from a light source toward the planar mirror 20, and the planar mirror 20 may then reflect the emitted light so that it is directed into the FOR. The planar mirror 20 may be positioned so that it is adjacent to and in close proximity to a window of the housing 100. There may be no additional optical elements located between the planar mirror 20 and the window so that the emitted light reflected by the planar mirror 20 is directed through the window without reflecting from or propagating through any other optical elements.

Adjacent reflective surfaces of the block are preferably joined to one another along a drag-reducing, non-sharp edge to promote aerodynamic efficiency and reduce audible noise. As an example, the block may include rounded or chamfered edges or corners. As another example, the block may include edges with texturing, grooves, riblets, or a sawtooth pattern. It is appreciated that additional features of the polygon mirror are described in U.S. patent application Ser. No. 15/958,749 filed on Apr. 20, 2018 and issued as U.S. Pat. No. 10,451,716 the entire contents are incorporated by reference herein.

The lidar sensor unit 10 may be in the form of a low profile scanner head provided as a box-like protrusion on any number of positions on a vehicle (e.g., each corner of the roof of a vehicle, preferably at 45° relative to each of the edges). In some examples, the lidar scanner system 10 may be partially embedded in the vehicle roof or other vehicle body part so only a window of the unit protrudes prominently from the roof (or hood, side mirror, rear-view mirror, windshield, bumper, grill, or other body part surface in which the lidar scanner head is disposed). In some implementations, the scanner 11 may include one or more non-moving stationary mirrors located between the planar mirror 20 and the polygon mirror 80. For example, a stationary mirror may be used to turn or steer the output beam or input beam and may allow the lidar system 10 to have a reduced overall height, width, or length. The stationary mirror may be positioned to receive the output beam from the polygon mirror 80 and reflect the output beam to direct it toward the reflective surface of the planar mirror 20.

The planar mirror 20 may be configured so as to pivot over a range of allowable motion larger than a range corresponding to the vertical angular dimension of the field of regard, so as to define a maximum range of allowable motion larger than a range within which the planar mirror 20 pivots during a scan. In some examples, a controller associated with the planar mirror 20 may select different portions of the maximum range of allowable motion as the range within which the mirror pivots, in accordance with modifications of the scan pattern. In particular, to modify at least one of a scan pattern or a scan rate, a controller associated with a motor of the polygon mirror 80 can be configured to cause the motor to vary the speed of rotation of the polygon mirror 80, cause the actuator assembly 30 to vary the vary the oscillation of the planar mirror 20, or both. The controller can be associated with both mirrors. The controller may be configured to modify the scan pattern on a frame-by-frame basis, each frame corresponding to a complete scan of the field of regard of the lidar sensor unit 10. In some implementations, the oscillation of the planar mirror 20 may be varied (e.g., to change the vertical angular dimension of the field of regard), and the rotational speed of the polygon mirror 80 may be regulated or stabilized so that the polygon mirror 80 rotates at a substantially constant speed.

Depending on the implementation, the controller may include one or more processors, an application-specific integrated circuit (ASIC), a field-programmable gate array (FPGA), and/or other suitable circuitry. The non-transitory computer-readable memory of the controller can be configured to store instructions executable by the controller as well as data which the controller can produce based on the signals from the components of the system 10 and/or provide to these components. The memory can include volatile (e.g., RAM) and/or non-volatile (e.g., flash memory, a hard disk) components. The data the controller generates during operation and stores in the memory can include pixel data and other results of analyzing characteristics of the target, alarm data (e.g., readings from the sensors that exceed certain predefined thresholds), and the configuration data the controller can retrieve from the memory during operation can include definitions of various scan patterns, for example. Alternatively or additionally to the memory, the controller can be configured to access memory disposed remotely relative to the lidar system 10 in the vehicle controller (see below) or even memory disposed remotely relative to the vehicle, such as on a network server. In addition to collecting data from receiver, the controller can provide control signals to and, in some implementations, receive diagnostics data from, the light source, the one or more sensors, and the scanner 11 via communication links.

In some implementations, the light source can be in the form of an output collimator having a lens rigidly coupled to an end of a fiber-optic cable, with the other end of the fiber-optic cable coupled to a laser disposed remotely relative to the scanner 11. In other implementations, the light source can be an assembly that includes a laser. The light source thus may include, or be optically coupled to, a laser which emits light having a particular operating wavelength in the infrared, visible, or ultraviolet portions of the electromagnetic spectrum. As a more specific example, the light source may include a laser with an operating wavelength between approximately 1.2 μm and 1.7 μm.

In operation, the light source emits an output beam of light which may be continuous-wave, pulsed, or modulated in any suitable manner for a given application. The output beam of light is directed downrange toward a remote target located a distance from the lidar system 10 and at least partially contained within a field of regard of the system 10. Depending on the scenario and/or the implementation of the lidar system 10, the distance can be between 1 m and 1 km, for example.

Once the output beam reaches the downrange target, the target may scatter or, in some cases, reflect at least a portion of light from the output beam, and some of the scattered or reflected light may return toward the lidar system 10. An input beam passes through the scanner 11 to the mirror. The mirror in turn directs the input beam to the receiver. The input beam may contain only a relatively small fraction of the light from the output beam. For example, the ratio of average power, peak power, or pulse energy of the input beam to average power, peak power, or pulse energy of the output beam may be approximately $10^{-1}$, $10^{-2}$, $10^{-3}$, $10^{-4}$, $10^{-5}$, $10^{-6}$, $10^{-7}$, $10^{-8}$, $10^{-9}$, $10^{-10}$, $10^{-11}$, or $10^{-12}$. As another example, if a pulse of the output beam has a pulse energy of 1 microjoule (μJ), then the pulse energy of a corresponding pulse of the input beam may have a pulse energy of approximately 10 nanojoules (nJ), 1 nJ, 100 picojoules (pJ), 10 pJ, 1 pJ, 100 femtojoules (fJ), 10 fJ, 1 fJ, 100 attojoules (aJ), 10 aJ, or 1 aJ.

The output beam may be referred to as a laser beam, light beam, optical beam, emitted beam, or just beam; and the input beam may be referred to as a return beam, received beam, return light, received light, input light, scattered light, or reflected light. As used herein, scattered light may refer to light that is scattered or reflected by the target. The input beam may include light from the output beam that is scattered by the target, light from the output beam that is reflected by the target, or a combination of scattered and reflected light from target. The input beam also can include "passive" light signals, or light from various other sources and of various wavelengths scattered by the target.

The operating wavelength of a lidar system 10 may lie, for example, in the infrared, visible, or ultraviolet portions of the electromagnetic spectrum. The Sun also produces light in these wavelength ranges, and thus sunlight can act as background noise which can obscure signal light detected by the lidar system 10. This solar background noise can result in false-positive detections or can otherwise corrupt measurements of the lidar system 10, especially when the receiver includes SPAD detectors (which can be highly sensitive).

In some implementations, the light source, the scanner 11, and the receiver are packaged together within a single housing, which may be a box, case, or enclosure that holds or contains all or part of a lidar system 10. The housing may include a window through which the beams pass. In one example implementation, the lidar-system housing contains the light source, an overlap mirror, the scanner 11, and the receiver of the lidar system 10. The controller may reside within the same housing as the components, or alternatively, the controller may reside remotely from the housing.

Moreover, in some implementations, the housing includes multiple lidar sensor units, each including a respective scanner and a receiver. Depending on the particular implementation, each of the multiple lidar sensor units can include a separate light source or a common light source. The multiple lidar sensor units can be configured to cover non-overlapping adjacent fields of regard or partially overlapping fields of regard, depending on the implementation.

The housing may be an airtight or watertight structure that prevents water vapor, liquid water, dirt, dust, or other contaminants from getting inside the housing. The housing may be filled with a dry or inert gas, such as for example dry air, nitrogen, or argon. The housing may include one or more electrical connections for conveying electrical power or electrical signals to and/or from the housing.

The light source may include a pulsed laser configured to produce or emit pulses of light with a certain pulse duration. In an example implementation, the pulse duration or pulse width of the pulsed laser is approximately 10 picoseconds (ps) to 20 nanoseconds (ns). In another implementation, the light source is a pulsed laser that produces pulses with a pulse duration of approximately 1-4 ns. In yet another implementation, the light source is a pulsed laser that produces pulses at a pulse repetition frequency of approximately 100 kHz to 5 MHz or a pulse period (e.g., a time between consecutive pulses) of approximately 200 ns to 10 μs. The light source may have a substantially constant or a variable pulse repetition frequency, depending on the implementation. As an example, the light source may be a pulsed laser that produces pulses at a substantially constant pulse repetition frequency of approximately 640 kHz (e.g., 640,000 pulses per second), corresponding to a pulse period of approximately 1.56 μs. As another example, the light source may have a pulse repetition frequency that can be varied from approximately 500 kHz to 3 MHz. As used herein, a pulse of light may be referred to as an optical pulse, a light pulse, or a pulse, and a pulse repetition frequency may be referred to as a pulse rate.

In general, the output beam may have any suitable average optical power, and the output beam may include optical pulses with any suitable pulse energy or peak optical power. Some examples of the average power of the output beam include the approximate values of 1 mW, 10 mW, 100 mW, 1 W, and 10 W. Example values of pulse energy of the output beam include the approximate values of 0.1μ, 1 μJ, 10 μJ, 100 μJ, and 1 mJ. Examples of peak power values of pulses included in the output beam are the approximate values of 10 W, 100 W, 1 kW, 5 kW, 10 kW. An example optical pulse with a duration of 1 ns and a pulse energy of 1 μJ has a peak power of approximately 1 kW. If the pulse repetition frequency is 500 kHz, then the average power of the output beam with 1-0 pulses is approximately 0.5 W, in this example.

The light source may include a laser diode, such as a Fabry-Perot laser diode, a quantum well laser, a distributed Bragg reflector (DBR) laser, a distributed feedback (DFB) laser, or a vertical-cavity surface-emitting laser (VCSEL).

The laser diode operating in the light source may be an aluminum-gallium-arsenide (AlGaAs) laser diode, an indium-gallium-arsenide (InGaAs) laser diode, or an indium-gallium-arsenide-phosphide (InGaAsP) laser diode, or any other suitable diode. In some implementations, the light source includes a pulsed laser diode with a peak emission wavelength of approximately 1400-1600 nm. Further, the light source may include a laser diode that is current-modulated to produce optical pulses.

In some implementations, the light source includes a pulsed laser diode followed by one or more optical-amplification stages. For example, the light source may be a fiber-laser module that includes a current-modulated laser diode with a peak wavelength of approximately 1550 nm, followed by a single-stage or a multi-stage erbium-doped fiber amplifier (EDFA) or erbium/ytterbium-doped fiber amplifier (EYDFA). As another example, the light source may include a continuous-wave (CW) or quasi-CW laser diode followed by an external optical modulator (e.g., an electro-optic modulator), and the output of the modulator may be fed into an optical amplifier. In yet other implementations, the light source may include a pulsed solid-state laser or a pulsed fiber laser.

The receiver may be referred to as (or may include) a photoreceiver, optical receiver, optical sensor, detector, photodetector, or optical detector. The receiver in some implementations receives or detects at least a portion of the input beam and produces an electrical signal that corresponds to the input beam. For example, if the input beam includes an optical pulse, then the receiver may produce an electrical current or voltage pulse that corresponds to the optical pulse detected by the receiver. In an example implementation, the receiver includes one or more avalanche photodiodes (APDs) or one or more single-photon avalanche diodes (SPADs). In another implementation, the receiver includes one or more PN photodiodes (e.g., a photodiode structure formed by a p-type semiconductor and an n-type semiconductor) or one or more PIN photodiodes (e.g., a photodiode structure formed by an undoped intrinsic semiconductor region located between p-type and n-type regions).

The receiver may have an active region or an avalanche-multiplication region that includes silicon, germanium, or InGaAs. The active region of receiver may have any suitable size, such as for example, a diameter or width of approximately 50-500 μm. The receiver may include circuitry that performs signal amplification, sampling, filtering, signal conditioning, analog-to-digital conversion, time-to-digital conversion, pulse detection, threshold detection, rising-edge detection, or falling-edge detection. For example, the receiver may include a transimpedance amplifier that converts a received photocurrent (e.g., a current produced by an APD in response to a received optical signal) into a voltage signal. The receiver may direct the voltage signal to pulse-detection circuitry that produces an analog or digital output signal that corresponds to one or more characteristics (e.g., rising edge, falling edge, amplitude, or duration) of a received optical pulse. For example, the pulse-detection circuitry may perform a time-to-digital conversion to produce the digital output signal. The receiver may send the electrical output signal 145A to the controller for processing or analysis, e.g., to determine a time-of-flight value corresponding to a received optical pulse.

The controller may be electrically coupled or otherwise communicatively coupled to one or more of the light source, the scanner 11, and the receiver. The controller may receive electrical trigger pulses or edges from the light source, where each pulse or edge corresponds to the emission of an optical pulse by the light source. The controller may provide instructions, a control signal, or a trigger signal to the light source indicating when the light source should produce optical pulses. For example, the controller may send an electrical trigger signal that includes electrical pulses, where the light source emits an optical pulse in response to each electrical pulse. Further, the controller may cause the light source to adjust one or more of the frequency, period, duration, pulse energy, peak power, average power, or wavelength of the optical pulses produced by the light source.

The controller 60 may determine a time-of-flight value for an optical pulse based on timing information associated with when the pulse was emitted by the light source and when a portion of the pulse (e.g., the input beam) was detected or received by the receiver. The controller may include circuitry that performs signal amplification, sampling, filtering, signal conditioning, analog-to-digital conversion, time-to-digital conversion, pulse detection, threshold detection, rising-edge detection, or falling-edge detection.

As indicated above, the lidar system 10 may be used to determine the distance to one or more downrange targets. By scanning the output beam across a field of regard, the lidar system 10 can be used to map the distance to a number of points within the field of regard. Each of these depth-mapped points may be referred to as a pixel or a voxel. A collection of pixels captured in succession (which may be referred to as a depth map, a point cloud, or a frame) may be rendered as an image or may be analyzed to identify or detect objects or to determine a shape or distance of objects within the FOR. For example, a depth map may cover a field of regard that extends 60° horizontally and 15° vertically, and the depth map may include a frame of 100-2000 pixels in the horizontal direction by 4-400 pixels in the vertical direction.

In some examples (not illustrated) a lidar system 10 may be provided that uses two eyes to scan a combined FOR rather than a single eye. Such a scanner 11 in this configuration may use two different reflective surfaces of the polygon mirror 80 to direct two output beams toward the target and concurrently receive and process two input beams.

The components of the lidar system 10 may be configured so that at least a portion of the planar mirror 20 extends above the rotatable polygon mirror 80, and only a region extending from a lower edge of the planar mirror 20 to a top of the housing projects prominently from a surface of a body of a vehicle on which the lidar system 10 is deployed.

In general, any suitable number of lidar sensor units 10 may be integrated into a vehicle. In one example implementation, multiple lidar sensor units 10 may be integrated into a car to provide a complete 360-degree horizontal FOR around the car. As another example, 4-10 lidar sensor units 10, each system having a 45-degree to 90-degree horizontal FOR, may be combined together to form a sensing system that provides a point cloud covering a 360-degree horizontal FOR. The lidar sensor units 10 may be oriented so that adjacent FORs have an amount of spatial or angular overlap to allow data from the multiple lidar sensor units 10 to be combined or stitched together to form a single or continuous 360-degree point cloud. As an example, the FOR of each lidar system may have approximately 1-15 degrees of overlap with an adjacent FOR. In particular embodiments, a vehicle may refer to a mobile machine configured to transport people or cargo. For example, a vehicle may include, may take the form of, or may be referred to as a car, automobile, motor vehicle, truck, bus, van, trailer, off-road vehicle, farm vehicle, lawn mower, construction equipment, golf cart, motorhome, taxi, motorcycle, scooter, bicycle, skateboard, train, snowmobile, watercraft (e.g., a ship or boat), aircraft (e.g., a fixed-wing aircraft, helicopter, or dirigible), or spacecraft. In particular embodiments, a vehicle may include an internal combustion engine or an electric motor that provides propulsion for the vehicle.

In some implementations, one or more lidar sensor units 10 are included in a vehicle as part of an advanced driver assistance system (ADAS) to assist a driver of the vehicle in the driving process. For example, a lidar sensor units 10 may be part of an ADAS that provides information or feedback to a driver (e.g., to alert the driver to potential problems or hazards) or that automatically takes control of part of a vehicle (e.g., a braking system or a steering system) to avoid collisions or accidents. The lidar sensor units 10 may be part of a vehicle ADAS that provides adaptive cruise control, automated braking, automated parking, collision avoidance, alerts the driver to hazards or other vehicles, maintains the vehicle in the correct lane, or provides a warning if an object or another vehicle is in a blind spot.

In some cases, one or more lidar sensor units 10 are integrated into a vehicle as part of an autonomous-vehicle driving system. In an example implementation, the lidar sensor units 10 provides information about the surrounding environment to a driving system of an autonomous vehicle. An autonomous-vehicle driving system may include one or more computing systems that receive information from the lidar sensor units 10 about the surrounding environment, analyze the received information, and provide control signals to the vehicle's driving systems (e.g., steering wheel, accelerator, brake, or turn signal). For example, the lidar sensor units 10 integrated into an autonomous vehicle may provide an autonomous-vehicle driving system with a point cloud every 0.1 seconds (e.g., the point cloud has a 10 Hz update rate, representing 10 frames per second). The autonomous-vehicle driving system may analyze the received point clouds to sense or identify targets and their respective locations, distances, or speeds, and the autonomous-vehicle driving system may update control signals based on this information. As an example, if the lidar system 10 detects a vehicle ahead that is slowing down or stopping, the autonomous-vehicle driving system may send instructions to release the accelerator and apply the brakes.

An autonomous vehicle may be referred to as an autonomous car, driverless car, self-driving car, robotic car, or unmanned vehicle. An autonomous vehicle may be a vehicle configured to sense its environment and navigate or drive with little or no human input. For example, an autonomous vehicle may be configured to drive to any suitable location and control or perform all safety-critical functions (e.g., driving, steering, braking, and parking) for the entire trip, with the driver not expected to control the vehicle at any time. As another example, an autonomous vehicle may allow a driver to safely turn their attention away from driving tasks in particular environments (e.g., on freeways), or an autonomous vehicle may provide control of a vehicle in all but a few environments, requiring little or no input or attention from the driver.

An autonomous vehicle may be configured to drive with a driver present in the vehicle, or an autonomous vehicle may be configured to operate the vehicle with no driver present. As an example, an autonomous vehicle may include a driver's seat with associated controls (e.g., steering wheel, accelerator pedal, and brake pedal), and the vehicle may be configured to drive with no one seated in the driver's seat or with little or no input from a person seated in the driver's seat. As another example, an autonomous vehicle may not include any driver's seat or associated driver's controls, and the vehicle may perform substantially all driving functions (e.g., driving, steering, braking, parking, and navigating) without human input. As another example, an autonomous vehicle may be configured to operate without a driver (e.g., the vehicle may be configured to transport human passengers or cargo without a driver present in the vehicle). As another example, an autonomous vehicle may be configured to operate without any human passengers (e.g., the vehicle may be configured for transportation of cargo without having any human passengers onboard the vehicle).

As indicated above, a light source of the lidar system 10 can be located remotely from some of the other components of the lidar system 10 (such as the scanner 11 and the receiver). Moreover, a lidar system implemented in a vehicle may include fewer light sources than scanners and receivers.

In one implementation, the controller generates and dynamically modifies the drive signal for the actuator system 30 which oscillates the planar mirror 20. The motor driving rotation of the polygon mirror 80 may operate in an open-loop mode, without relying on control signals from the controller. In this implementation, the motor driving the polygon mirror 80 may rotate at a constant speed to generate similar scan lines, while variations in the speed at which the planar mirror 20 moves relative to the axis of oscillation can result in some scan lines being farther apart, some scan lines being closer together, etc. Further, the controller can modify the drive signal for the actuator system 30 to reposition the entire operational FOR of the lidar system 10 within the larger range motion available to the planar mirror 20. Still further, the controller can modify the drive signal for the actuator system 30 to "stretch" the FOR of the operational FOR of the lidar system 10 so as to encompass the entire available FOR. In some implementations, the motor driving rotation of the polygon mirror 80 may operate in a closed-loop mode, where the motor receives a control signal that regulates, stabilizes, or adjusts the rotational speed of the polygon mirror 80. For example, the polygon mirror 80 may be provided with a tab that passes through one or more stationary photo-interrupters as the polygon mirror 80 rotates. The signals from the photo-interrupters may be sent to the controller, and the controller may provide a control signal to the motor to maintain the rotation speed of the polygon mirror 80 at a substantially constant value.

In other implementations, however, the controller modifies the drive signal supplied to the motor to thereby adjust the rotation of the polygon mirror 80. For example, the controller may slow down the rotation of the polygon mirror 80 when the output beam (or a pair of output beams associated with the same eye) traverses the middle of the scan line, so that pixel density near the center of the horizontal FOR is higher than at the periphery of the horizontal FOR.

The controller 60 may modify the drive signal for the motor and/or the drive signal for the actuator system 30 dynamically in response to various triggering events. In addition to detection of an upward or downward slope, examples of suitable triggering events include detection of a particular object in a certain direction relative to the vehicle (e.g., if an object is moving quickly across the path of the vehicle, the lidar system 10 may modify the scan pattern to obtain a higher density rate where the object is detected to be able to better respond to the potential threat of collision), a sound detected at in a certain direction relative to the vehicle, a heat signature detected at in a certain direction relative to the vehicle, etc.

The forward scan may cause the mirror 20 to rotate at a particular rotation rate. For example, one forward scan of the mirror may correspond to an approximately 15-degree rotation of the mirror over a time interval of approximately 100 ms, which corresponds to a rotation rate of approximately 2.6 rad/s. The forward scan rate may be approximately constant (e.g., approximately 2.6 rad/s), or the forward scan rate may be varied (e.g., between approximately 1 rad/s and approximately 4 rad/s) to adjust the density of scan lines. For example, the forward scan rate may be slower near the middle of the FOR so that more scan lines are located in that region and fewer scan lines are directed at the ground or sky. The snap-back may include a relatively rapid deceleration of the mirror 20 followed by a relatively rapid movement of the mirror 20 back to the forward-scan starting position. For example, one forward scan may have a duration of approximately 20-200 ms, and a snap-back may have a duration of approximately 0.5-10 ms.

In some implementations, a scanner 11 may include an electronic driver that provides a drive current to the coil member of the coil assembly. The coil drive current may include (i) a low-amplitude current and (ii) a high-amplitude square-wave current signal. The low-amplitude current may cause the mirror 20 to pivot about the mirror axle in a forward-scan direction. The high-amplitude square-wave current signal may include a negative-current pulse followed by a positive-current pulse, which causes the mirror to execute a snap-back motion. The negative-current pulse may have a polarity or direction that is opposite the low-amplitude current, and the positive-current pulse may have the same polarity as the low-amplitude current. In the snap-back motion, the mirror 20 rapidly slows down, moves in the opposite direction (relative to the forward-scan direction), and then rapidly slows down again to begin a new forward scan. The negative-current pulse causes the rotation rate of the mirror to slow and then reverse direction (in the direction opposite the forward-scan direction), and the positive-current pulse causes the rotation rate of the mirror to slow and then begin moving in the forward-scan direction. The low-amplitude current may be a substantially constant current that causes the mirror 20 to pivot at a particular rotation rate (e.g., approximately 1 rad/s, approximately 2 rad/s, approximately 5 rad/s, or approximately 10 rad/s). Alternatively, the low-amplitude current may vary so that the rotation speed of the mirror 20 varies similarly while scanning the FOR. The relatively high-amplitude current pulses of the square-wave current signal may have each have an amplitude that is more than approximately 5 times, approximately 10 times, approximately 100 times, or approximately 1,000 times larger than the relatively low-amplitude current.

So configured, the scanner is highly efficient, and therefore eliminates the need for exotic materials. Further, the actuator assembly takes up minimal space and allows the overall window width and box height of the unit to be reduced, which may provide aerodynamic advantages as well as scanning advantages. The actuator assembly uses a small number of magnets, which are typically expensive, thus reducing overall costs. Further, by placing the bearings inside of the rotor assembly, the overall width of the unit is reduced.

In some cases, a computing device may be used to implement various modules, circuits, systems, methods, or algorithm steps disclosed herein. As an example, all or part of a module, circuit, system, method, or algorithm disclosed herein may be implemented or performed by a general-purpose single- or multi-chip processor, a digital signal processor (DSP), an ASIC, a FPGA, any other suitable programmable-logic device, discrete gate or transistor logic, discrete hardware components, or any suitable combination thereof. A general-purpose processor may be a microprocessor, or, any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In particular embodiments, one or more implementations of the subject matter described herein may be implemented as one or more computer programs (e.g., one or more modules of computer-program instructions encoded or stored on a computer-readable non-transitory storage medium). As an example, the steps of a method or algorithm disclosed herein may be implemented in a processor-executable software module which may reside on a computer-readable non-transitory storage medium. In particular embodiments, a computer-readable non-transitory storage medium may include any suitable storage medium that may be used to store or transfer computer software and that may be accessed by a computer system. Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs (e.g., compact discs (CDs), CD-ROM, digital versatile discs (DVDs), blue-ray discs, or laser discs), optical disc drives (ODDs), magneto-optical discs, magneto-optical drives, floppy diskettes, floppy disk drives (FDDs), magnetic tapes, flash memories, solid-state drives (SSDs), RAM, RAM-drives, ROM, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

In some cases, certain features described herein in the context of separate implementations may also be combined and implemented in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

While operations may be depicted in the drawings as occurring in a particular order, this should not be understood as requiring that such operations be performed in the particular order shown or in sequential order, or that all operations be performed. Further, the drawings may schematically depict one more example processes or methods in the form of a flow diagram or a sequence diagram. However, other operations that are not depicted may be incorporated in the example processes or methods that are schematically illustrated. For example, one or more additional operations may be performed before, after, simultaneously with, or between any of the illustrated operations. Moreover, one or more operations depicted in a diagram may be repeated, where appropriate. Additionally, operations depicted in a diagram may be performed in any suitable order. Furthermore, although particular components, devices, or systems are described herein as carrying out particular operations, any suitable combination of any suitable components, devices, or systems may be used to carry out any suitable operation or combination of operations. In certain circumstances, multitasking or parallel processing operations may be performed. Moreover, the separation of various system components in the implementations described herein should not be understood as requiring such separation in all implementations, and it should be understood that the described program components and systems may be integrated together in a single software product or packaged into multiple software products.

Various implementations have been described in connection with the accompanying drawings. However, it should be understood that the figures may not necessarily be drawn to scale. As an example, distances or angles depicted in the figures are illustrative and may not necessarily bear an exact relationship to actual dimensions or layout of the devices illustrated.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes or illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend.

The term "or" as used herein is to be interpreted as an inclusive or meaning any one or any combination, unless expressly indicated otherwise or indicated otherwise by context. Therefore, herein, the expression "A or B" means "A, B, or both A and B." As another example, herein, "A, B or C" means at least one of the following: A; B; C; A and B; A and C; B and C; A, B and C. An exception to this definition will occur if a combination of elements, devices, steps, or operations is in some way inherently mutually exclusive.

As used herein, words of approximation such as, without limitation, "approximately, "substantially," or "about" refer to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skill in the art recognize the modified feature as having the required characteristics or capabilities of the unmodified feature. In general, but subject to the preceding discussion, a numerical value herein that is modified by a word of approximation such as "approximately" may vary from the stated value by ±0.5%, ±1%, ±2%, ±3%, ±4%, ±5%, ±10%, ±12%, or ±15%.

As used herein, the terms "first," "second," "third," etc. may be used as labels for nouns that they precede, and these terms may not necessarily imply a particular ordering (e.g., a particular spatial, temporal, or logical ordering). As an example, a system may be described as determining a "first result" and a "second result," and the terms "first" and "second" may not necessarily imply that the first result is determined before the second result.

As used herein, the terms "based on" and "based at least in part on" may be used to describe or present one or more factors that affect a determination, and these terms may not exclude additional factors that may affect a determination. A determination may be based solely on those factors which are presented or may be based at least in part on those factors. The phrase "determine A based on B" indicates that B is a factor that affects the determination of A. In some instances, other factors may also contribute to the determination of A. In other instances, A may be determined based solely on B.

What is claimed is:

1. A scanner for a lidar system, the scanner comprising:
   a mirror including a first end, a second end, and a reflective surface and being pivotable along a mirror axle, wherein the mirror is configured to direct emitted light of the lidar system; and
   an actuator assembly disposed at the first end of the mirror, the actuator assembly including an asymmetric motor configured to exert a torque on the mirror to cause the mirror to pivot about the mirror axle, wherein the asymmetric motor comprises:
      a body having a core and a coil; and
      a rotor assembly positioned asymmetrically relative to the body, the rotor assembly including a rotor housing and a rotor at least partially disposed within the rotor housing to rotatably couple with the mirror along the mirror axle.

2. The scanner of claim 1, wherein the actuator assembly comprises:
   the core having a base portion and a plurality of legs extending therefrom, the base portion defining a coil opening;
   the coil operably coupled with the core; and
   the rotor assembly at least partially disposed between the plurality of legs of the core, the rotor assembly including the rotor housing and the rotor at least partially disposed within the housing to rotatably couple with the mirror along the mirror axle.

3. The scanner of claim 2, wherein the rotor assembly includes at least one curved magnet operably disposed on an outer surface of the housing, the at least one curved magnet being positioned between the plurality of legs of the core.

4. The scanner of claim 1, wherein the rotor assembly includes at least one bearing disposed within the rotor housing.

5. The scanner of claim 4, wherein the at least one bearing includes a needle bearing.

6. The scanner of claim 1, wherein the mirror includes a support structure positioned on an opposite side of the reflective surface, the support structure extending a length between the first and second ends of the mirror.

7. The scanner of claim 6, wherein the support structure includes a honeycomb support structure.

8. The scanner of claim 1, wherein an overall height of the scanner is approximately 2".

9. The scanner of claim 1, wherein the actuator assembly comprises:
   the core having a plurality of legs;
   the rotor assembly at least partially disposed between the plurality of legs of the core, the rotor assembly including the rotor housing and the rotor at least partially disposed within the housing to rotatably couple with the mirror along the mirror axle.

10. The scanner of claim 1, further comprising:
    a rotatable polygon mirror having a block including a first wall, a second wall, and a plurality of reflective surfaces extending between the first and second walls, the reflective surfaces being angularly offset from one another along a periphery of the block; and a polygon mirror axle extending into the block through at least one of the first wall or the second wall, about which the block rotates.

11. The scanner of claim 10, wherein the polygon mirror axle is orthogonal to the mirror axle.

12. The scanner of claim 10, wherein:
the polygon mirror is configured to receive the emitted light from a light source of the lidar system, and the reflective surfaces of the polygon mirror are configured to sequentially reflect the emitted light toward the reflective surface of the mirror; and
the reflective surface of the mirror is configured to receive the emitted light from the polygon mirror and reflect the emitted light into a field of regard of the lidar system.

13. The scanner of claim 12, further comprising a stationary mirror configured to receive the emitted light from the polygon mirror and reflect the emitted light toward the reflective surface of the mirror.

14. The scanner of claim 1, wherein the scanner is contained within a housing comprising a window through which the emitted light is transmitted, wherein the mirror is positioned adjacent to the window.

15. A lidar system comprising:
a light source configured to emit light;
a scanner configured to direct the emitted light to scan a field of regard of the lidar system in accordance with a scan pattern, the scanner including:
  a mirror including a first end, a second end, and a reflective surface and being pivotable along a mirror axle; and
  an actuator assembly disposed at the first end of the mirror, the actuator assembly including an asymmetric motor configured to exert a torque on the mirror to cause the mirror to pivot about the mirror axle, wherein the asymmetric motor comprises:
    a body having a core and a coil; and
    a rotor assembly positioned asymmetrically relative to the body, the rotor assembly including a rotor housing and a rotor at least partially disposed within the rotor housing to rotatably couple with the mirror along the mirror axle;
a receiver configured to detect at least a portion of the emitted light scattered by one or more remote targets; and
a controller configured to control motion of at least the mirror to scan the emitted light along the scan pattern.

16. The lidar system of claim 15, wherein the actuator assembly comprises:
the core having a base portion and a plurality of legs extending therefrom, the base portion defining a coil opening;
the coil operably coupled with the core; and
the rotor assembly at least partially disposed between the plurality of legs of the core, the rotor assembly including the rotor housing and the rotor at least partially disposed within the housing to rotatably couple with the mirror along the mirror axle.

17. The lidar system of claim 16, wherein the rotor assembly includes at least one curved magnet operably disposed on an outer surface of the housing, the at least one curved magnet being positioned between the plurality of legs of the core.

18. The lidar system of claim 15, wherein the rotor assembly includes at least one bearing disposed within the rotor housing.

19. The lidar system of claim 18, wherein the at least one bearing includes a needle bearing.

20. The lidar system of claim 15, wherein the mirror includes a support structure positioned on an opposite side of the reflective surface, the support structure extending a length between the first and second ends of the mirror.

* * * * *